J. BECKER, DEC'D.
E. BECKER, ADMINISTRATOR.
ART OF CUTTING SCREW THREADS.
APPLICATION FILED FEB. 7, 1918.

1,318,045.

Patented Oct. 7, 1919.

Witness: J. M. Fowler Jr.

Inventor
Joseph Becker

J. BECKER, DEC'D.
E. BECKER, ADMINISTRATOR.
ART OF CUTTING SCREW THREADS.
APPLICATION FILED FEB. 7, 1918.

1,318,045.

Patented Oct. 7, 1919.

|  | At 62°F $I =$ inches | At 32°F $M + d$ millimeters | $\dfrac{M + d}{M}$ | $\dfrac{d \cdot 10^6}{M}$ | Error in parts per million | Change gear Formula $\dfrac{I \cdot p \cdot n}{M}$ |
|---|---|---|---|---|---|---|
| Lodge | 13 = | 330 + 0.2 | 1.000 606 | 606 | +423 | $\dfrac{13 \cdot p \cdot n}{330}$ |
|  | 18 = | 457 + 0.2 | 1.000 438 | 438 | +255 | $\dfrac{18 \cdot p \cdot n}{457}$ |
|  | 23 = | 584 + 0.2 | 1.000 342 | 342 | +159 | $\dfrac{23 \cdot p \cdot n}{584}$ |
|  | 28 = | 711 + 0.2 | 1.000 281 | 281 | +98 | $\dfrac{28 \cdot p \cdot n}{711}$ |
|  | 33 = | 838 + 0.2 | 1.000 239 | 239 | +56 | $\dfrac{33 \cdot p \cdot n}{838}$ |
|  | 38 = | 965 + 0.2 | 1.000 207 | 207 | +24 | $\dfrac{38 \cdot p \cdot n}{965}$ |
| Becker | 43 = | 1092 + 0.2 | 1.000 183 | 183 | 0 | $\dfrac{43 \cdot p \cdot n}{1092}$ |
|  | 48 = | 1219 + 0.2 | 1.000 164 | 164 | -19 | $\dfrac{48 \cdot p \cdot n}{1219}$ |
|  | 53 = | 1346 + 0.2 | 1.000 149 | 149 | -35 | $\dfrac{53 \cdot p \cdot n}{1346}$ |
|  | 58 = | 1473 + 0.2 | 1.000 136 | 136 | -47 | $\dfrac{58 \cdot p \cdot n}{1473}$ |
| Boys | 63 = | 1600 + 0.2 | 1.000 125 | 125 | -58 | $\dfrac{63 \cdot p \cdot n}{1600}$ |
|  | 68 = | 1727 + 0.2 | 1.000 116 | 116 | -67 | $\dfrac{68 \cdot p \cdot n}{1727}$ |
|  | 73 = | 1854 + 0.2 | 1.000 108 | 108 | -75 | $\dfrac{73 \cdot p \cdot n}{1854}$ |
| Chambers | 438 = | 11125 + 0.2 | 1.000 018 | 18 | -165 | $\dfrac{438 \cdot p \cdot n}{11125}$ |
| Wead | 5 = | 127 + 0.0 | 1.000 000 | 0 | -183 | $\dfrac{5 \cdot p \cdot n}{127}$ |

Fig. 5.

Witness
J. M. Fowler Jr.

Inventor
Joseph Becker

Fig. 6

J. BECKER, DEC'D.
E. BECKER, ADMINISTRATOR.
ART OF CUTTING SCREW THREADS.
APPLICATION FILED FEB. 7, 1918.

| Inches at 62°F $I$ | = | Millimeters at 32°F $M + d$ | $\dfrac{d}{M} \times 10^6$ | Error | Prime factors in $\dfrac{I \times p \times n}{M}$ |
|---|---|---|---|---|---|
| 137 | = | 3479 + 0.8 | 230 | +47 | $\dfrac{137 \cdot p \cdot n}{7 \cdot 7 \cdot 71}$ |
| 104 | = | 2641 + 0.6 | 227 | +44 | $\dfrac{2 \cdot 2 \cdot 2 \cdot 13 \cdot p \cdot n}{19 \cdot 139}$ |
| 109 | = | 2768 + 0.6 | 217 | +34 | $\dfrac{109 \cdot p \cdot n}{2 \cdot 2 \cdot 2 \cdot 2 \cdot 173}$ |
| 38 | = | 965 + 0.2 | 207 | +24 | $\dfrac{2 \cdot 19 \cdot p \cdot n}{5 \cdot 193}$ |
| 81 | = | 2057 + 0.4 | 194 | +11 | $\dfrac{3 \cdot 3 \cdot 3 \cdot 3 \cdot p \cdot n}{11 \cdot 11 \cdot 17}$ |
| 124 | = | 3149 + 0.6 | 191 | +8 | $\dfrac{2 \cdot 2 \cdot 31 \cdot p \cdot n}{47 \cdot 67}$ |
| 43 | = | 1092 + 0.2 | 183 | 0 | $\dfrac{43 \cdot p \cdot n}{2 \cdot 2 \cdot 3 \cdot 7 \cdot 13}$ |
| 177 | = | 4495 + 0.8 | 178 | −5 | $\dfrac{3 \cdot 59 \cdot p \cdot n}{5 \cdot 29 \cdot 31}$ |
| 134 | = | 3403 + 0.6 | 176 | −7 | $\dfrac{2 \cdot 67 \cdot p \cdot n}{41 \cdot 83}$ |
| 48 | = | 1219 + 0.2 | 164 | −19 | $\dfrac{2 \cdot 2 \cdot 2 \cdot 2 \cdot 3 \cdot p \cdot n}{23 \cdot 53}$ |
| 149 | = | 3784 + 0.6 | 159 | −24 | $\dfrac{149 \cdot p \cdot n}{2 \cdot 2 \cdot 2 \cdot 11 \cdot 43}$ |
| 101 | = | 2565 + 0.4 | 156 | −27 | $\dfrac{101 \cdot p \cdot n}{3 \cdot 3 \cdot 3 \cdot 5 \cdot 19}$ |
| 217 | = | 5511 + 0.8 | 145 | −38 | $\dfrac{7 \cdot 31 \cdot p \cdot n}{3 \cdot 11 \cdot 167}$ |
| 164 | = | 4165 + 0.6 | 144 | −39 | $\dfrac{2 \cdot 2 \cdot 41 \cdot p \cdot n}{5 \cdot 7 \cdot 7 \cdot 17}$ |
| 169 | = | 4292 + 0.6 | 140 | −43 | $\dfrac{13 \cdot 13 \cdot p \cdot n}{2 \cdot 2 \cdot 29 \cdot 37}$ |
| 247 | = | 6273 + 0.8 | 128 | −55 | $\dfrac{13 \cdot 19 \cdot p \cdot n}{3 \cdot 3 \cdot 17 \cdot 41}$ |

Fig. 7

Witness
J. M. Fowler Jr.

Inventor
Joseph Becker

J. BECKER, DEC'D.
E. BECKER, ADMINISTRATOR.
ART OF CUTTING SCREW THREADS.
APPLICATION FILED FEB. 7, 1918.

1,318,045.

Patented Oct. 7, 1919.

TABLE FOR CONVERTING
IN ACCORDANCE WITH EQUATION 2
(43 INCHES = 1092 MM)

| STEEL INCHES | & | STEEL MILLIMETERS |
|---|---|---|
| 0.039 377 289 | = | 1 |
| 0.078 754 579 | = | 2 |
| 0.118 131 868 | = | 3 |
| 0.157 509 158 | = | 4 |
| 0.196 886 447 | = | 5 |
| 0.236 263 736 | = | 6 |
| 0.275 641 026 | = | 7 |
| 0.315 018 315 | = | 8 |
| 0.354 395 604 | = | 9 |
| 1 | = | 25.395 349 |
| 2 | = | 50.790 698 |
| 3 | = | 76.186 047 |
| 4 | = | 101.581 395 |
| 5 | = | 126.976 744 |
| 6 | = | 152.372 093 |
| 7 | = | 177.767 442 |
| 8 | = | 203.162 791 |
| 9 | = | 228.558 140 |

*Fig. 8*

Witness
J. M. Fowler Jr.

Inventor
Joseph Becker

UNITED STATES PATENT OFFICE.

JOSEPH BECKER, OF WASHINGTON, DISTRICT OF COLUMBIA; EDMUND BECKER ADMINISTRATOR OF SAID JOSEPH BECKER, DECEASED.

ART OF CUTTING SCREW-THREADS.

1,318,045. Specification of Letters Patent. Patented Oct. 7, 1919.

Continuation of application Serial No. 168,446, filed May 14, 1917. This application filed February 7, 1918. Serial No. 215,843.

*To all whom it may concern:*

Be it known that I, JOSEPH BECKER, a citizen of the United States, residing at 1315 Fairmont street N. W., Washington, District of Columbia, U. S. A., have invented a new and useful Improvement in the Art of Cutting Screw-Threads, of which the following is a specification.

The present patent application, identified as Case Ay, is a continuation of my prior herein merged and, therefore, hereby abandoned Case Aw, Serial No. 168,446, filed May 14, 1917, which was allowed August 7, 1917. This present Case Ay, like its herein merged predecessor, Case Aw, is based on a further and somewhat different development of the inventive idea involved in the combined "inch and millimeter end measure" of my prior patent application, Case Av, Serial No. 144,903, which was filed January 27, 1917, as a continuation of my therein merged earlier application, Case Q, Serial No. 562,181, itself filed May 18, 1910.

The present invention relates to the art of cutting screw threads; its prime object being to permit of cutting threads having a millimetric pitch, by means of a lathe whose lead-screw is based on the English inch.

The object in view has heretofore been attained by using in the set of change wheels of the lathe a special or so-called "translating" gear wheel having one hundred and twenty seven teeth.

My present invention is based on the discovery that a translating gear wheel having not more than forty three teeth permits of securing a more accurate result, besides having the obvious advantage of being much less expensive and less cumbersome. The 127 tooth wheel is in fact much larger, and, therefore, also much more expensive, than any wheel in common use.

In my said prior application, Case Av, it is made plain that the use of the 127 tooth wheel is really based on the assumption that $$5 \text{ inches} = 127 \text{ millimeters} \quad (1)$$

also that such equation holds only under special conditions, as, for instance, when the metric scale and the inch scale are both graduated on the same bar, and so as to be exact at or about the same standard temperature.

As the U. S. and English lathes are intended to be standard at 62 degrees Fahrenheit, it follows that any millimetric pitch cut in such lathes, with the aid of a translating wheel having 127 teeth, can only be exact at or about 62 degrees Fahrenheit.

The standard temperature of metric gages, however, is 32 degrees Fahrenheit, or 30 degrees Fahrenheit lower than 62, and this reduction in temperature is sufficient to produce an appreciable contraction which must be allowed for in the change wheels; because all gages, lathes, etc., being made of steel or iron, expand approximately 11 parts in a million per degree centigrade; and a difference of 30 degrees Fahrenheit being equal to 50/3 degrees centigrade produces an expansion of 11×50/3 equal to 550/3 or 183 and 1/3 parts in a million.

I have accordingly discovered that, for present purposes, the proper equivalent is not that defined by equation 1, but the one defined by the following equation, to wit:

$$43 \text{ inches} = 1092 \text{ millimeters} \quad (2)$$

As 1092 equals the product of $(7 \times 12 \times 13)$, the prime number 43 is the largest prime number involved in equation 2, and it is the only one which calls for the use of a special or "translating" wheel of 43 teeth, instead of the usual wheel of 127 teeth.

Special wheels having tooth numbers of twice 43, or 86, and three times 43, or 129, may present advantages in certain cases; and an additional special wheel of 7 by 13 or 91 teeth also has its advantages.

In the accompanying drawings:

Figs. 5 to 7 are charts which are useful in explaining the exact nature and scope of my present invention.

Figure 1:
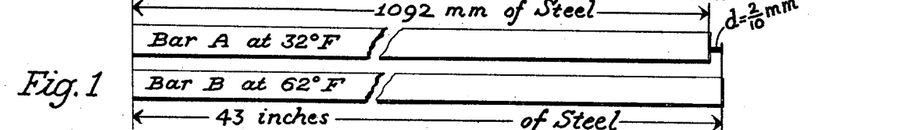
Figures 1 and 2 are diagrams showing how a steel bar A, 1092 millimeters long, and a steel bar B, 43 inches long, will, when kept at their respective standard temperatures of 32 and 62 degrees Fahrenheit, as in Fig. 1, differ in length by an amount $d$, which vanishes whenever the said bars A and B are brought to any one same temperature, as in Fig. 2.
Figure 2:
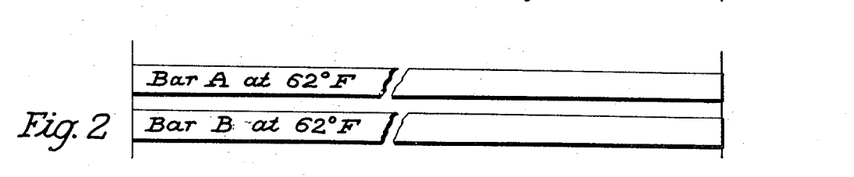

The principle evolved in equation 2, above, is illustrated in Figs. 1 and 2, showing two steel bars distinguished as "Bar A" and "Bar B." Bar A in Fig. 1 is supposed to be kept at the standard temperature of metric gages, 32°, F., while bar B is being kept at the higher standard temperature of inch gages, 62° F.; and under these conditions bar A is, as indicated in the figure, exactly 1092 millimeters long, whereas bar B is exactly 43 inches long; and their difference $d$ is equal to two-tenths of a millimeter, because 43 inches at 62° F. equal 25.4 times 43, or 1092.2 mm. at 32° F.

Now, let the temperature of bar A in Fig. 1 be raised 30 degrees from 32° F. up to 62° F., and it will expand to become, as in Fig. 2, equal to bar B, because its expansion (being, as explained above, 183 and 1/3 parts per million, or 550/3000000) will be 1092×550/3000000 or 0.2002 mm., which is substantially the same as the difference $d$ of 2/10 mm. shown in Fig. 1.

The bars A and B being, therefore, equal in length when both are kept, as in Fig. 2, at 62° F., they will henceforth expand and contract together, so as to remain equal in length at all temperatures.

Assuming that no cut in a lathe is made sufficiently heavy and fast to heat the work appreciably, the lathe, its lead-screw and the work, may all three be considered as being simultaneously at the same uniform though variable temperature.

If, therefore, at any given moment and temperature the nominally 1092 millimeter steel bar A represents a piece of work in a lathe, the nominally 43-inch steel bar B will, at the same given moment and temperature, represent the correspondingly equal part of the lead-screw in the same lathe. The true equivalent for cutting steel or iron screws is, therefore, the equivalent defined by equation 2, above, and illustrated in Figs. 1 and 2.

The rule for calculating a train of change wheels to secure any desired pitch, or feed per turn of work, is given by the general equation:

$$\frac{a.b.c.d}{a'.b'.c'.d'} = \frac{\text{feed } p \text{ of tool per turn of work W}}{\text{feed P of tool per turn of lead-screw L}} \quad \text{------------(3)}$$

Here $a$, $b$, $c$, $d$, are the respective tooth numbers of wheels whose teeth act as pushing or driving teeth; while $a'$, $b'$, $c'$, $d'$, are the respective tooth numbers of wheels whose teeth act as push-receiving or driven teeth.

The number of driver wheels used rarely exceeds three, but four are given in equation 3 so as to cover the most complicated cases.

Figure 3:
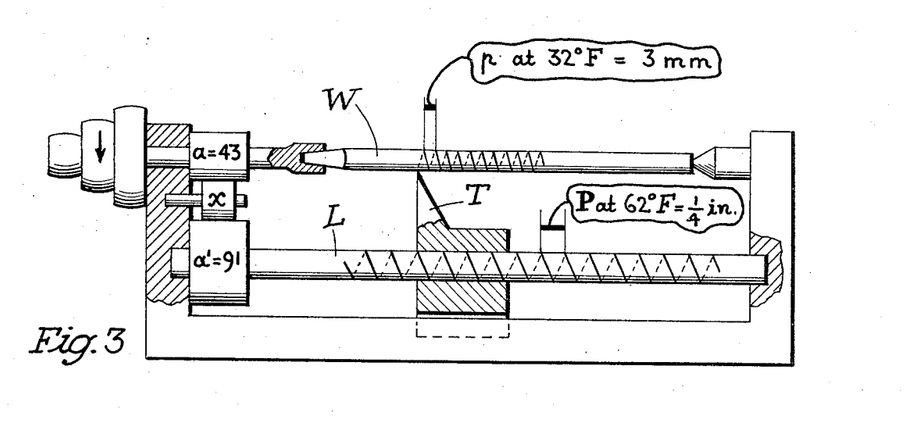
Fig. 3 is a diagram of the simplest arrangement that can be used in accordance with my invention for cutting, in a steel rod W, a metric thread, whose pitch $p$ at 32° F. is 3 millimeters; by means of the tool T having a lead-screw L, whose pitch P at 62° F. is 1/4 inch; such arrangement requiring two special wheels, to wit: a driver wheel $a$ of 43 teeth, and a driven wheel $a'$ of 91 teeth, connected by an idler $x$ of any preferred number of teeth.

Single wheel idlers, such as $x$ in Fig. 3, being used for the sole purpose of filling air gaps and reversing the direction of rotation, may be of any size, and are, therefore, left out of the computation. If accidentally included, an idler of $x$ teeth, enters equation 3, first as a driven wheel of $x$ teeth, then as a driver of $x'$, equal $x$, teeth; so that the ratio $x/x'$ equals unity, and does not affect the result as determined by the other factors, $a$, $b$, $c$, $d$, or $a'$, $b'$, $c'$, $d'$.

Equation 3, therefore, is general, and includes every kind of wheel that may be used in a train of change wheels.

If the linear feed per turn of the work be $p$ millimeters; and the linear feed per turn of the lead-screw be P equal $1/n$ inch ($n$ being the number of turns per inch in the lead-screw), then equation 3 becomes:

$$\frac{abcd}{a'b'c'd'} = \frac{p \text{ millimeters}}{1/n \text{ inches}} \quad \text{------(4)}$$

$$= \frac{pn \text{ millimeters}}{1 \text{ inch}} \quad \text{------(5)}$$

but, in view of equation 2, one inch is 1092/43 millimeters, hence $$\frac{abcd}{a'b'c'd'} = \frac{43pn}{1092} = \frac{43pn}{7.12.13} \quad \text{------(6)}$$

where $p$ may be any desired millimetric pitch to be cut in the work W; and $n$ may be any desired number of lead-screw turns per inch.

For cutting millimetric threads two drivers, $a$, $b$, and two driven wheels, $a'$, $b'$, are generally sufficient, and in some cases these are reduced to one driver wheel $a$ and one driven wheel $a'$, with the usual idler $x$ to connect them.

The manner of using this fundamental equation 6 will now be illustrated by a few selected, simple examples:

*Example one.*

Referring to Fig. 3, let it be required to use a train of change gears comprising a single driver wheel $a$, and, therefore, a single driven wheel $a'$, to cut, in a rod W, a metric thread of pitch $p$ equal 3 millimeters, from a lead-screw L whose thread makes $n$ equal 4 turns per inch.

Equation 6, above, yields directly $$\frac{a}{a'} = \frac{43.3.4}{7.12.13} = \frac{43}{7.13}$$

$$= \frac{43}{91}$$

showing that the driver wheel $a$ should have 43 teeth, and that the driven wheel $a'$ should have 91 teeth. The idler $x$, of course, may have any preferred number of teeth.

*Example two.*

Figure 4:
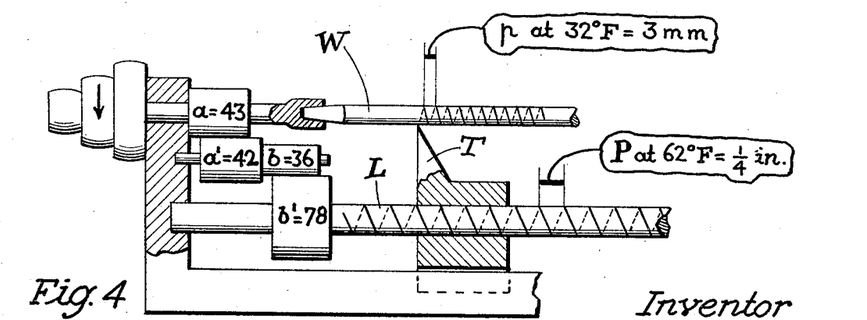
Fig. 4 is a diagram of an arrangement comprising two driver wheels $a$, $b$ and two driven wheels $a'$, $b'$, to form a combination that cuts the same thread as in Fig. 3 from the same lead-screw; the main object of this combination being, to permit of using the current wheel sizes of 36, 42, and 78 teeth, instead of the special wheel of 91 teeth that is necessary in Fig. 3.

Referring to Fig. 4, let it be required to use a train of change gears comprising two driver wheels $a$, $b$, and, therefore, also two driven wheels $a'$, $b'$, to cut, in a rod W, a metric thread of pitch $p$ equal 3 millimeters, from a lead-screw L whose thread makes $n$ equal 4 turns per inch. This is the same problem as in Example one, excepting that two driver wheels are used instead of one.

Equation 6, above, yields directly as before in "Example one":

$$\frac{a.b}{a'.b'} = \frac{43.3.4}{7.12.13} = \frac{43}{7.13}$$

Assuming that we have a series of change wheels, whose tooth numbers are multiples of 6, we may write:

$$\frac{a.b}{a'.b'} = \frac{43.36}{(7.6).(13.6)}$$

$$= \frac{43.36}{42.78}$$

indicating that we are to make:

$$a = 43$$
$$b = 36$$
$$a' = 42$$
$$b' = 78$$

all as shown in Fig. 4.

*Example three.*

A lathe having a lead-screw whose thread makes $n$ equal 12 turns per inch, and having a set of change wheels whose tooth numbers are multiples of 4, is to be used in cutting the fifteen different pitches of the Système International, which is referred to more fully in Note 13 below.

Equation 6, above, yields in the present case:

$$\frac{a.b}{a'.b'} = \frac{43.p.12}{7.12.13} = \frac{43.p}{7.13}$$

and as we must, in the present example, use tooth numbers that are multiples of 4, we may write $$\frac{a.b}{a'.b'} = \frac{43.p.16}{28.52}$$

$$= \frac{43.16p}{28.52}$$

That is to say, any one of the fifteen different pitches of the Système International may be cut as indicated in the annexed Table A, by using only three different wheels of 28, 43 and 52 teeth, in combination with one single variable change wheel having $b$ or $16p$ teeth.

Table A.

Lead-screw turns, $n=12$.
Variable gear wheel, $b=16p$.

| $p$ | $a$ | $a'$ | $b$ | $b'$ |
|---|---|---|---|---|
| 1 mm. | 43 | 28 | 16 | 52 |
| 1.25 | | | 20 | |
| 1.5 | | | 24 | |
| 1.75 | | | 28 | |
| 2 mm. | | | 32 | |
| 2.5 | | | 40 | |
| 3 mm. | | | 48 | |
| 3.5 | | | 56 | |
| 4 mm. | | | 64 | |
| 4.5 | | | 72 | |
| 5 mm. | | | 80 | |
| 5.5 | | | 88 | |
| 6 mm. | | | 96 | |
| 6.5 | | | 104 | |
| 7 mm. | | | 112 | |

*Example four.*

A lathe having a lead-screw whose thread makes $n$ equal 8 turns per inch, and having a set of change wheels whose tooth numbers are multiples of 5 is to be used in cutting the fifteen different pitches of the Système International. The set of change wheel comprises, furthermore, two special wheels for cutting metric threads, one of twice 43 or 86 teeth, and one of 7 by 13 or 91 teeth, and it is desired to use these wheels instead of a wheel of 43 teeth.

In the present case, Equation 6 above yields:

$$\frac{a.b}{a'.b'} = \frac{43.p.8}{7.12.13} = \frac{43.p.2}{7.3.13}$$

whence $$\frac{a.b}{a'.b'} = \frac{86.p}{91.3}$$

$$= \frac{86.20p}{91.60}$$

That is to say, all metric pitches of the Système International may be cut, as indicated in the annexed Table B, by using only three different wheels of 86, 91, and 60 teeth, in combination with a single variable change wheel whose variable tooth number $b$ is $20p$.

Table B.

Lead-screw turns, $n=8$.
Variable gear wheel, $b=20p$.

| $p$ | $a$ | $a'$ | $b$ | $b'$ |
|---|---|---|---|---|
| 1 mm. | 86 | 91 | 20 | 60 |
| 1.25 |   |   | 25 |   |
| 1.5  |   |   | 30 |   |
| 1.75 |   |   | 35 |   |
| 2 mm. |   |   | 40 |   |
| 2.5 |   |   | 50 |   |
| 3 mm. |   |   | 60 |   |
| 3.5 |   |   | 70 |   |
| 4 mm. |   |   | 80 |   |
| 4.5 |   |   | 90 |   |
| 5 mm. |   |   | 100 |   |
| 5.5 |   |   | 110 |   |
| 6 mm. |   |   | 120 |   |
| 6.5 |   |   | 130 |   |
| 7 mm. |   |   | 140 |   |

In using any one of the combinations in Table A, or in Table B, it is well to note that special circumstances may impose changes in the arrangement of the wheels, or may impose substitution of wheels having other tooth numbers, or the insertion of an idler wheel. All such permissible changes are controlled by the following general rules, which, so far as I know, are here clearly and fully enunciated for the first time:

RULE 1.—Transposing any two driver wheels (such as $a$ and $b$ in Fig. 4) does not change the pitch $p$.

RULE 2.—Transposing any two driven wheels (such as $a'$ and $b'$ in Fig. 4) does not change the pitch $p$.

RULE 3.—If the tooth number of any one driver wheel, and the tooth number of any one driven wheel (such as numbers $a$ and $b'$ in Fig. 4) both be multiplied, or else divided, by the same number, either whole or fractional, no change is made in the pitch $p$.

RULE 4.—The thread cut is left handed where the number of wheel-contacts is odd (as it would be in Fig. 3, if no intermediate idler wheel were used).

RULE 5.—The thread cut is right-handed where the number of wheel-contacts is even (as in either Fig. 3 or Fig. 4, where the number of wheel-contacts is two).

The only restriction placed on Rule 3 is that the final result must contain whole number tooth numbers, exclusively.

It was pointed out above that a single wheel idler of $x$ teeth is the equivalent of a compound idler comprising two equal wheels, to wit: a driven wheel of $x$ teeth and a driver wheel of $x'$, equal $x$, teeth; also that such single wheel idler may have any other arbitrary number of teeth. This principle, that a single wheel idler may have any number of teeth, was quite evident where first referred to, but it is well to note here, that it is in accordance, and substantially identical, with the present Rule 3, whose utility is further illustrated by the following example:

*Example five.*

A lathe having a lead-screw whose thread makes $n$ equal 12 turns per inch is to be used to cut the fifteen different pitches of the Système International by means of a set of change wheels comprising my two special wheels of 86 and 91 teeth, with all other tooth numbers running as multiples of 6, from 24 to 96, including a single duplicate gear wheel of 48 teeth.

Equation 6, in this case, yields:

$$\frac{a.b}{a'.b'} = \frac{43.p.12}{7.12.13} = \frac{43.p}{7.13}$$

whence $$\frac{a.b}{a'.b'} = \frac{86.p}{91.2}$$

or finally $$\frac{a.b}{a'.b'} = \frac{86.24p}{91.48}$$

and this, by transportation under Rule 1, is equivalent to $$\frac{a.b}{a'.b'} = \frac{24p.86}{91.48}$$

That is to say, the fifteen different pitches of the Système International may be cut with a four-wheel train such as seen in Fig. 4, but whose respective tooth numbers are $$a = 24p$$
$$a' = 91$$
$$b = 86$$
$$b' = 48$$

Here the wheels 91 and 86 constitute an invariable compound idler $a'b$, Fig. 4, having one of its elements $b$ or 86 in constant engagement with an invariable lead-screw wheel $b'$, of 48 teeth, and having its other idler element $a'$ of 91 teeth swung up into engagement with the driver $a$ which constitutes the single variable element of the combination. The tooth number $24p$ of this variable wheel $a$ increases regularly from 24 to 168, as indicated in the annexed Table C:

Table C.

Lead-screw turns, $n=12$.
Variable gear wheel, $a=24p$.

| $p$ | $a$ | $a'$ | $b$ | $b'$ |
|---|---|---|---|---|
| 1 mm. | 24 | 91 | 86 | 48 |
| 1.25 | 30 |   |   |   |
| 1.5  | 36 |   |   |   |
| 1.75 | 42 |   |   |   |
| 2 mm. | 48 |   |   |   |
| 2.5 | 60 |   |   |   |
| 3 mm. | 72 |   |   |   |
| 3.5 | 84 |   |   |   |
| 4 mm. | 96 | 91 | 86 | 48 |
| 4.5 | 108 |   |   |   |
| 5 mm. | 120 |   |   |   |
| 5.5 | 132 |   |   |   |
| 6 mm. | 144 |   |   |   |
| 6.5 | 156 |   |   |   |
| 7 mm. | 168 |   |   |   |

*Table C′.*

Lead-screw turns, $n=12$.
Variable gear wheel, $a=12p$.

| a | a′ | b | b′ |
|---|----|---|----|
| 48 | 91 | 86 | 24 |
| 54 |    |    |    |
| 60 |    |    |    |
| 66 |    |    |    |
| 72 |    |    |    |
| 78 |    |    |    |
| 84 |    |    |    |

But, as the highest available tooth number under the conditions of the present example is 96, the last six pitches must necessarily be cut with the lower term trains listed in Table C′ whose six trains are derived from the last six trains of Table C, under Rule 3, by halving the tooth number of the first driver $a$ and that of the last driven wheel $b′$.

*The 86/91 compound idler.*

Whenever the 86/91 compound idler is used as in my said Tables C and C′, equation 6 may be written as $$\frac{a.b}{a′.b′} = \frac{a.86}{91.b′} = \frac{43.p.n}{1092} = \frac{86.p.n}{2.1092} = \frac{86.p.n}{24.91}$$

where the second member and the last, by cancellation, yield $$\frac{a}{b′} = \frac{p.n}{24}$$

Hence, if the pitch $p$ to be cut is 24 millimeters, and the pitch of the lead-screw is the even, but approximately equal, length of one inch, this last equation becomes $$\frac{a}{b′} = 1$$

whence $$a = b′$$

If, therefore, an inch standard lathe has a full set of change wheels for cutting $t′$, $t″$, $t‴$, etc., turns to the inch, with the aid of a single wheel idler; then, the simple substitution of my 86/91 compound idler, for such single wheel idler, does convert the lathe into a metric lathe which will cut the same $t′$, $t″$, $t‴$, etc., series of turns in an exact metric length of 24 millimeters. Moreover, this length of 24 mm. differs so little from an inch that the cutting range of the lathe is not changed in any marked degree.

My 86/91 compound idler, therefore, simply serves as a substitute for the usual single wheel idler, to convert, in the most direct manner possible, any inch-standard lathe, into a metric lathe.

*The three different inches.*

From disclosures in my said Case Av, it appears: first, that the legal value of the "international meter" in the United States is 39.37 "United States legal inches;" secondly, that the legal value of the same "international meter" in Great Britain is 39.370113 "British legal inches."

These two values may be expressed in the form of equations, as follows:

1000 mm. = 39.37 U. S. legal ins________ (7)
1000 mm. = 39.370113 Br. legal ins______ (8)

Multiplying each of these equations throughout by 127/1000 produces 127 mm. = 4.99999 U. S. legal ins_______ (9)
127 mm. = 5.000004351 Br. legal ins____ (10)

which are both complete and exact values because all decimals given in the two legal values have been retained in the calculation. Equations 9 and 10 may evidently be rewritten in the form $$127 \text{ mm.} = 5\left(1 - \frac{2}{1000000}\right) \text{U. S. legal ins} \quad (11)$$

$$127 \text{ mm.} = 5\left(1 + \frac{0.8702}{1000000}\right) \text{Br. leg. ins} \quad (12)$$

and these two equations divided throughout by 5 yield $$25.4 \text{ mm.} = \left(1 - \frac{2}{1000000}\right) \text{U. S. leg. ins} \quad (13)$$

$$25.4 \text{ mm.} = \left(1 + \frac{0.8702}{1000000}\right) \text{Br. leg. ins} \quad (14)$$

In my said Case Av I have moreover given the name "metric inch" to the length defined by the exact equations, to wit:

127 mm. = 5 metric inches__________ (15)
25.4 mm. = 1 metric inch____________ (15′)

This "metric inch," by equation 13, is 2 parts in a million shorter than the "U. S. legal inch;" and, by equation 14, it is less than one millionth longer than the "British legal inch."

The "metric inch" of exactly 25.4 mm., therefore, is a very convenient, intermediate or compromise inch, differing less from either one of the two legal inches than they differ from each other; and it is the only one used in the present specification, wherever the French and the English lengths to be compared are supposed to be kept, as in Fig. 1, at their respective standard temperatures of 32 and 62 degrees Fahrenheit. Under the special conditions of Fig. 1, therefore, the millimetric equivalent of a given number I of inches is $$I \text{ inches} = (I \times 25.4) \text{ mm} \quad \quad (16)$$

so that bar B, in Fig. 1, being 43 inches long at 62° F., must, as previously noted, be equal to 43×25.4, or 1092.2 millimeters in bar A, kept at 32° F.

Notes on Thermal Expansion.

NOTE 1.—According to Le Chatelier (*Comptes Rendus* of the French Academy of Sciences, Paris, 1889, tome 129, page 332, lines 19 to 25), it may be admitted that the different varieties of iron and steel, at ordinary temperatures, expand eleven parts per million per degree centigrade.

NOTE 2.—Commandant Hartmann, of the French artillery, with his "automatic recording comparator" found the expansion of ordinary steel to be 10.7 parts per million per degree centigrade. See *Comptes Rendus* of the French Academy of Sciences, Paris, 1895, tome 120, page 1027, foot note.

NOTE 3.—Kaye (of the National Physical Laboratory, England) and Laby, in their "*Tables of Physical and Chemical Constants*," London, 1916, page 53, for the expansion of iron in its different forms, give:

|  | Expansion in millionths per 1° C. |
|---|---|
| Cast iron | 10.2 |
| Steel | 10.5 |
| Do | 11.6 |
| Wrought iron | 11.9 |
| Sum | 44.2 |
| Average | 11.05 |

NOTE 4.—The "Landolt-Börnstein *Physikalisch-Chemische Tabellen*," edited under the auspices of the Prussian Academy of Sciences, by Börnstein and Roth, Berlin, 1912, on page 341, in Table No. 99, for the thermal expansion of iron in its various forms, at 20 degrees centigrade (68° F.), give values which I have re-expressed and re-arranged in size order, as follows:

|  | Condition. | Expansion in millionths per 1° C. |
|---|---|---|
| Steel | 0° to 300° C. | 9.307 |
| Cast iron | 0° to 625° C. | 10.2 |
| Annealed steel | 0° to 80° C. | 10.563 |
| Coarse-grained steel | 15° to 36° C. | 10.95 |
| Iron | 16° to 36° C. | 11.10 |
| Ingot steel | 0° to 750° C. | 11.391 |
| Ingot iron | 0° to 750° C. | 11.687 |
| Wrought iron | 0° to 500° C. | 11.915 |
| Sum |  | 87.113 |
| Average |  | 10.889 |

NOTE 5.—The "*Smithsonian Physical Tables*," fifth revised edition, prepared by F. E. Fowle, Washington, D. C., 1910, page 222, Table 219, for the thermal expansion of iron in its different forms, give values which I have re-expressed and re-arranged in size order, as follows:

|  | Condition. | Expansion in millionths per 1° C. |
|---|---|---|
| Cast iron | −191 to 16 | 8.50 |
| Do | 40° | 10.61 |
| Annealed steel | 40° | 10.95 |
| Wrought iron | −18 to 100 | 11.40 |
| Soft iron | 40° | 12.10 |
| Steel | 40° | 13.22 |
| Sum |  | 66.78 |
| Average |  | 11.13 |

The values here tabulated, comprising extremes obtained under exceptional conditions that cannot possibly be encountered in screw-cutting, are, nevertheless, included between the comparatively narrow limits of 11 minus 3 or 8 millionths, and 11 plus 3 or 14 millionths, per degree centigrade.

NOTE 6.—There never has been, so far as I know, any intentional attempt to allow for the expansion shown in my Fig. 1. The 127 tooth driven wheel of Note 20, below, could only be exact in case the expansion per degree centigrade for all materials involved were equal to zero. The Boys 63-tooth driver wheel of Note 23, below, accidentally provides for an insufficient expansion of 0.2/1600 multiplied by 3/50, or 7.5 millionths per degree centigrade; while the Lodge 13-inch solution of Note 21, below, accidentally provides for a highly excessive expansion of 0.2/330 multiplied by 3/50, or 36.35 millionths per degree centigrade; but each of these allowances was involuntary and, to their authors, apparently unavoidable, hence they were as stated, purely "accidental," and neither one comes within the comparatively narrow range from 8 to 14 millionths, which according to Notes 1 to 5, above, surely comprises all values of the thermal expansion of iron in its most diversified forms and conditions of use.

Notes on standard temperatures.

NOTE 7.—The standard temperature of the international meter is 0° centigrade or 32° F., this being the temperature of the bar when it is surrounded by a mass of shaved and melting ice, which constitutes the most convenient, certain and reliable thermostat known to science.

NOTE 8.—As a result, there never have been any doubts as to the temperature, 32° F., of the standard meter of 1799; such as have frequently arisen, in the past, with reference to the standard temperature, 62° F., and, therefore, also with reference to the length, of the original imperial standard yard of 1855 (which, however, had the additional objection of being made of a copper alloy, which, according to page 4 of the Kaye and Laby "tables" (fully cited in Note 3, above), is "now known not to be suitable for standards of length".

NOTE 9.—Metric gages, therefore, for all scientific purposes are made standard at this same temperature 0° C. or 32° F.; but, for industrial purposes, certain, and especially German, makers had adopted a standard temperature of 15° C. or 59° F. According to Guillaume, however, the French artillery ("section technique de l'artillerie"), in or about 1895, made a thorough investigation of the whole question, and they arrived at the conclusion that the introduction of any such secondary temperature, for industrially used gages, would be a useless and troublesome complication. They accordingly adopted for the purposes of the French artillery the same standard temperature, to wit: 0° C. or 32° F., as that used for the original meter bars of 1779 and 1889; and the same practice is followed by the International Bureau, the French Navy, the well known Parisian house of "Bariquand & Marre," the universally celebrated "Société Genevoise," of Switzerland, and also, where the measure is metric, in the wonderfully accurate Johansson gages. Moreover, the practice has met with the indorsement of the International Committee, which has frequently discussed, and condemned, the use of any secondary standard temperature. (See Comité International des Poids et Mesures, *Procès-Verbaux des Séances*, as follows: session of 1901, pp. 125–126, and pp. 137–141; session of 1909, pp. 111–113, and pp. 145–150; also the very complete article on "Industrial standards of length," by Guillaume, of the International Bureau, in "*La Nature*," Paris, July 30, 1910, pp. 130–135, particularly p. 133.)

NOTE 10.—According to Stadthagen, of the "Normal-Eichungskommission," measures of length are officially tested and verified in Germany for the normal standard temperature of 0° C.; unless the particular gage or rule submitted for verification is one that is expressly intended to be exact at a different temperature, and has this different temperature distinctly marked thereon. (See *Zeitschrift des Vereines Deutscher Ingenieure*, Berlin, September 9, 1911, second half of vol. 55, p. 1529, column 2; particularly the footnote in lines 60 to 63.)

NOTE 11.—No man ever will know exactly what 62° F. meant in 1855, because the corrections to be applied to the then exclusively used mercury in glass thermometers were not fully understood. The present British legalized ratio of the yard to the meter, however, as fixed in 1895, by coöperation of the London "Standards Office" with the "Bureau International," near Paris, now makes 62° F. equal to 16.667° C. of the 1887 standard hydrogen thermometer of the International Committee, and this equals 16.742° C. of the mercury in "verre dur" thermometer whose irregularities are now thoroughly understood. (See lines 10 to 31, page 18, of the 25-page report of Benoît, entitled "*Détermination du Rapport du Yard au Mètre*," which is the first one of the six separately paged scientific papers constituting Tome XII of the "*Travaux et Mémoires du Bureau International des Poids et Mesures*," Paris, 1902. See also, in the same Tome XII, the fifth paper, or report of the proceedings at the 1895 or Second Sextennial General Conference of Weights and Measures, pages 45 to 51; or, instead, pp. 114 to 120 of the more complete "*Comptes Rendus des Séances de la Deuxième Conférence Générale des Poids et Mesures Réunie à Paris en 1895*," Paris, 1896.)

*General remarks.*

NOTE 12.—In all that precedes it is assumed that the work W in Figs. 3 and 4 is of iron or steel. To consider it as being brass, or any other different metal, would needlessly complicate matters by introducing differences in the coefficient of expansion that may be, and that are, wholly ignored in practice.

NOTE 13.—The "Système International" of screw threads is the metric standard corresponding to the well known English standard of Whitworth, and to the American standard of Sellers. It is frequently, but incorrectly, referred to as the S. J. system because its abbreviation S. I. is printed S. J. in Germany, where they stubbornly insist on using the same character J for the two letters I and J. One of the most complete and authoritative accounts of the S. I., or international system of screw threads, is found on pages 421 to 457 of the *Bulletin de la Société d'Encouragement pour l'Industrie Nationale*, Paris, 1899, which gives on page 451 the fifteen different pitches listed in my annexed tables A, B, and C. These same pitches are listed in any reasonably complete modern pocket book for mechanical engineers. See, for instance, *The Mechanical Engineer's Reference Book* of Henry Harrison Suplee, Philadelphia, 1913, page 318. Suplee calls it "internationale" (with a final "e"), but this is another frequently committed error which must be due to one of the earlier, and surely not French, writers on the subject.

NOTE 14.—Consider W, in either Fig. 3 or Fig. 4, as a lead-screw and L as the work, reversing tool T to correspond, and you have the inverted picture of a French lathe cutting quarter-inch threads, from a lead-screw having a pitch of 3 millimeters.

NOTE 15.—I am aware that structures which are supposed to be capable of cutting metric threads from an inch standard lead-screw are shown in the four following U. S. patents, to wit: Putnam, No. 525,863, issued September 11, 1894; Laur, No. 818,632, issued April 24, 1906; Baerbalck, No. 820,377, issued May 8, 1906; Schatz, No. 918,773, issued April 20, 1909. None of these patents, however, makes any mention of the number of teeth that must be used to secure such result.

NOTE 16.—I am aware that a treatise on lathe gearing, entitled *Change Gear Devices*, by Oscar E. Perrigo, New York, 1903, pages 40 to 41, referring to the said U. S. patent of Putnam, also alleges that the Putnam device is adapted to cut metric threads from an inch lead-screw, but the book does not anywhere make the slightest reference to the number of teeth that might be used to secure such result.

NOTE 17.—I am aware that several authorities, Shaw cited below, for instance, recommend, as being "sufficiently accurate," the use of a wheel of 63 teeth, their calculations being virtually founded on the assumed, though not explicity stated, equivalent of 63 inches equal to 1600 millimeters. But, according to the conversion tables given on pages 5 and 10 of the "*Smithsonian Physical Tables*" (prepared by Frederick E. Fowle, and published by the Smithsonian Institute, Washington, D. C., 1914), 63 inches must equal either 1600.1986 mm. or 1600.203 mm, according to whether the inches used are British inches of U. S. inches; and either of these values, to two decimal places, equals 1600.20 mm. This two-tenth millimeter excess, in the light of present disclosures, may be treated as representing a thermal expansion whose relative value is 2/16000, or 125 parts in a million, instead of 183 parts in a million, as provided by my rule. The 63-tooth wheel, therefore, instead of being less accurate for present purposes than the 127-tooth wheel, as universally understood (see, for instance, Thomas R. Shaw, "*Lathes, Screw Machines, Boring and Turning Mills*," Manchester, England, 1903, pages 177 to 179), is in fact more accurate.

NOTE 18.—Very full tables of change wheel trains adapted to cut metric pitches, with a 63-tooth wheel from a lead-screw having either 1/2 or 1/4-inch pitch are given in Chapter X, pages 133 to 149, of "*Screws and Screw Making with a Chapter on the Milling Machine*," edited for and published by the Britannia Company, makers of engineers' tools, Colchester, England, 1891 (copy in the Patent Office Library).

NOTE 19.—Any rule for cutting metric threads from an inch standard lead-screw may, in the light of present disclosures, be considered as based on the more or less directly made assumption that a certain whole number, I, of inches is exactly equal to a certain corresponding whole number, M, of millimeters. The five most important change gear formulæ so far treated of, for cutting metric threads from an inch standard lead-screw may, therefore, be considered as based on one of the five following assumed equations, to wit:

$$5 \text{ inches} = 127 \text{ mm} \quad (17)$$
$$13 \text{ inches} = 330 \text{ mm} \quad (18)$$
$$43 \text{ inches} = 1092 \text{ mm} \quad (19)$$
$$63 \text{ inches} = 1600 \text{ mm} \quad (20)$$
$$438 \text{ inches} = 11125 \text{ mm} \quad (21)$$

That is to say, if any given whole number, I, of inches be considered equal to a corresponding whole number, M, of millimeters, then my fundamental equation 6 above may be written in the generalized form, to wit:

$$\frac{a.b.c.d}{a'.b'.c'.d'} = \frac{I.p.n.}{M} \quad (22)$$

NOTE 20.—Equation 17 is implied in the proposition of Charles K. Wead, first made in the "*American Journal of Science and Arts*," New Haven, Connecticut, 1882, third series, vol. 23, pages 176 and 177; and again made, by the same author, in the "*London, Edinburgh, and Dublin Philosophical Magazine and Journal of Science*" for June, 1883, fifth series. Vol. XV, pages 438 and 439. In accordance with my equation 22 above, equation 17 leads to the following change gear formula, to wit:

$$\frac{a.b.c.d}{a'.b'.c'.d'} = \frac{5.p.n}{127} \quad (23)$$

and, as 127 is a prime number, this involves the use of a driven wheel having 127 teeth. This so-called "translating wheel" is very generally known, as proved by communications from 12 different U. S. and foreign manufacturers and engineers, collected in "*Machinery*" New York, February, 1900, pages 164, 165. For a very full exposition of its use, see: Erik Oberg, *Handbook of Small Tools*, New York, 1908, Pages 58 to 66.

NOTE 21.—Equation 18 is given in the form: 13 inches equal 33 centimeters, by Sir Oliver Lodge, in "*Nature*," London, March 19, 1891, vol. 43, page 463, column 2, middle five-line paragraph; and it is implied in the virtually identical relation, 6.5 inches equal 16.5 centimeters, of De Vries, "*The Calculation of Change Wheels for Screw Cutting on Lathes*", London and New York, 1914, page 23 and page 27. (Copy in the Scientific Library of the U. S. Patent Office.) The change gear formula corresponding to this equation 18 is $$\frac{a.b.c.d}{a'.b'.c'.d'} = \frac{13.p.n}{330} \quad (24)$$

NOTE 22.—Equation 19 is the one discovered and first disclosed by me in the present application, Case Ay, which not only makes a valuable contribution to the art, but, furthermore, sheds, it is believed, considerable light on the work of all previous investigators in this line. The change gear formula corresponding to this equation 19 is evidently that of equation 6 above, or $$\frac{a.b.c.d}{a'.b'.c'.d'} = \frac{43.p.n}{1092} \quad \text{------} \quad (25)$$

NOTE 23.—Equation 20 is implied, first in the change wheel trains disclosed by C. V. Boys, of the Royal College of Science, in *Nature*, London, March 12, 1891, page 439; secondly, in the "Britannia tables" of Note 18, above; thirdly, in the Shaw citation of Note 17, above; fourthly, in the 315-inch equivalent of Ernest Pull cited at length in Note 25 below. The change gear formula corresponding to this equation 20 is:

$$\frac{a.b.c.d}{a'.b'.c'.d'} = \frac{63.p.n}{1600} \quad \text{------} \quad (26)$$

NOTE 24.—Equation 21 is implied in the set of change wheels given under "Wheel work" in "*Chambers's Encyclopædia*," Vol. X, Philadelphia, 1868, in a paragraph on page 163, column 1, lines 8 to 26. In the Chambers example a metric thread, of pitch $p$ equal to 5 millimeters, is cut from a lead-screw whose pitch P is one-quarter inch, by means of a train whose two products are stated to be $5 \times 5 \times 89$, and $2 \times 2 \times 2 \times 3 \times 73$, and this special train is easily derivable from the following change gear formula:

$$\frac{a.b}{a'.b'} = \frac{438.p.n}{11125} \quad \text{------} \quad (27)$$

which is based on my equation 22 above, and which yields $$\frac{a.b}{a'.b'} = \frac{(6 \times 73).p.n}{5 \times 25 \times 89} = \frac{(6 \times 73) \times 5 \times 4}{5 \times 25 \times 89}$$

$$= \frac{24 \times 73}{25 \times 89}$$

Doubling the first driver wheel 24 and the first driven wheel 25, under Rule 3, produces the equivalent train $$48 \times 73 / 50 \times 89,$$

whose tooth numbers are those given by Wead (at the places cited in Note 20, above) in his presentation of the Chambers result. Wead, however, apparently misled by the special form of statement used in Chambers, says that the order of the wheels "beginning with the spindle is 50, 48, 89, 73," which incorrectly makes drivers of the driven wheels 50, 89, and driven wheels of the drivers 48, 73.

NOTE 25.—Ernest Pull, in "*Screw Cutting for Engineers*," London, 1916, page 43, line 6, states that: 315 inches equal 8000 millimeters; but this equation, divided throughout by 5, assumes the form: 63 inches equal 1600 millimeters; as in equation 20, above.

NOTE 26.—D. de Vries, in "*The Calculation of Change-Wheels for Screw Cutting on Lathes*," London and New York, 1914, page 27, states that: 6.5 inches equal 16.5 centimeters; but this equation, multiplied throughout by 2, assumes the form: 13 inches equal 33 centimeters, or 330 millimeters; as in my equation 18, above.

NOTE 27.—To the best of my knowledge and belief, thermal expansion has not been mentioned or even referred to, either directly or indirectly, in any document that I have ever seen on the subject of change gear calculations; although its commercial importance has not been overlooked, in other connections, as will appear by referring to Chisholm, "*On the Science of Weighing and Measuring*," London, 1877, page 118. Chisholm says: "For all commercial purposes, on the other hand, the measure of a meter is always used at ordinary temperatures, just as a yard measure is used, and the comparison of the two should therefore be more properly made at the same average temperature of 62° F."; that is to say, made as in my present Fig. 2.

Scope of the invention.

NOTE 28.—If in Fig. 1 we add 5 inches of steel to bar B, and then add 127 millimeters of steel to bar A, we obtain, in view of equation 15, two new longer bars A' and B' (not shown) whose difference $d$ or (B'−A'), under the conditions of Fig. 1, is still equal to 2/10 of a millimeter. The expansion $e$ of this 48-inch bar, for 30° F., is really $e$ equal to 48/43 of $d$, instead of $d$; but the difference between $d$ and $e$ is not so great that we might not adopt, instead of equation 2, the equation, to wit: 43 plus 5 or 48 inches, equal, 1092 plus 127 or 1119 millimeters.

NOTE 29.—The general formula for any approximate equivalent, with constant difference $d$ of 2/10 millimeter, such as defined in Note 21, is evidently $$(43 \pm 5y) \text{ inches} = (1092 \pm 127y) \text{ mm} \quad \text{---} \quad (28)$$

where $y$ is a whole number in the natural series 0, 1, 2, 3, 4, etc. When $y$ equals zero we have equation 2, above, which is the preferred value. By making $y$ successively equal to plus and minus 1, 2, 3, 4, 5 and 6, we obtain the 13 to 73-inch lengths listed in the tabular Fig. 5. The 13-inch length is that of Lodge, or equation 18, above; while the 63-inch length is that of Boys, or equation 20, above; all others are entirely novel, excepting the Chambers 438-inch length of equation 21, which is obtained by making $y$, of equation 28, equal to the excessively large factor 79. The Wead equivalent, of equation 17, with $d$ equal to zero, is also given in the table for comparison with the others; and its error, for present purposes, it should be noted, is as large as 183 parts in a million.

Figure 5:
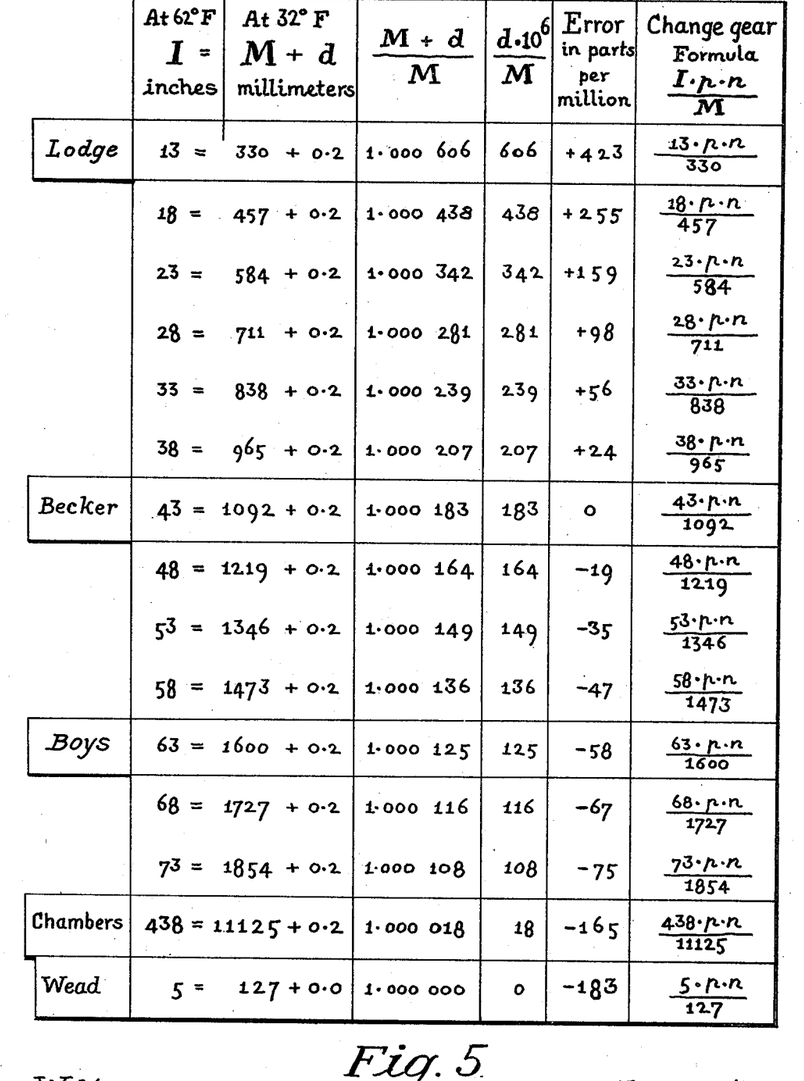

NOTE 30.—The relative or $d/M$ value of the difference $d$, multiplied by one million, is tabulated, in Fig. 5, under the head "$d.10^6/M$"; and the corresponding departure, from the preferred value of 183 millionths, is tabulated in the same Fig. 5, under the head "Error." The departures of the older solutions are seen to be: plus 423, in the Lodge solution; minus 58, in the Boys solution; minus 165, in the Chambers solution; and minus 183, in the Wead solution. The smallest of these prior accidental departures is the departure of 58 millionths in the Boys solution; and it is plain, that any solution involving a departure smaller than 58 millionths, comes within the scope of my invention. That is to say, in the present tabular Fig. 5 the solutions yielded by the 33, 38, 48, 53, and 58-inch lengths are all closer to my preferred 43-inch solution than any other so far proposed by any other investigator.

NOTE 31.—Double the lengths of the bars A and B, in Fig. 1, and their difference $d$ is doubled in absolute value, but without producing any change in its relative $d/M$ value, or in the numerical I/M ratio, or, therefore, in the final result. If, after doubling, the 5-inch and 127 millimeters additions of Notes 21, 22 and Equation 28, above, be made, a twofold denser table of values is obtained than that given in Fig. 5. Similarly, by using any multiplier $x$ to produce basic lengths of $Ax$ millimeters and $Bx$ inches, where $x$ is a whole number taken in the series 1, 2, 3, 4, 5, etc., an endless series of gradually denser tables may be formed, each similar to the table of Fig. 5 and having, within the same error limits, an $x$-fold, or gradually increasing, number of terms; and any solution in these various tables is derivable from the three general equations $$I = (43x \pm 5y) \text{ inches} \quad (29)$$
$$M = (1092x \pm 127y) \text{ millimeters} \quad (30)$$
$$d = 0.2x \text{ millimeters} \quad (31)$$

for, if $x$, in these Equations 29, 30, and 31, be made equal to zero, an interesting series is obtained that includes my form of the Wead solution given in the tabular Fig. 5.

Figure 6:
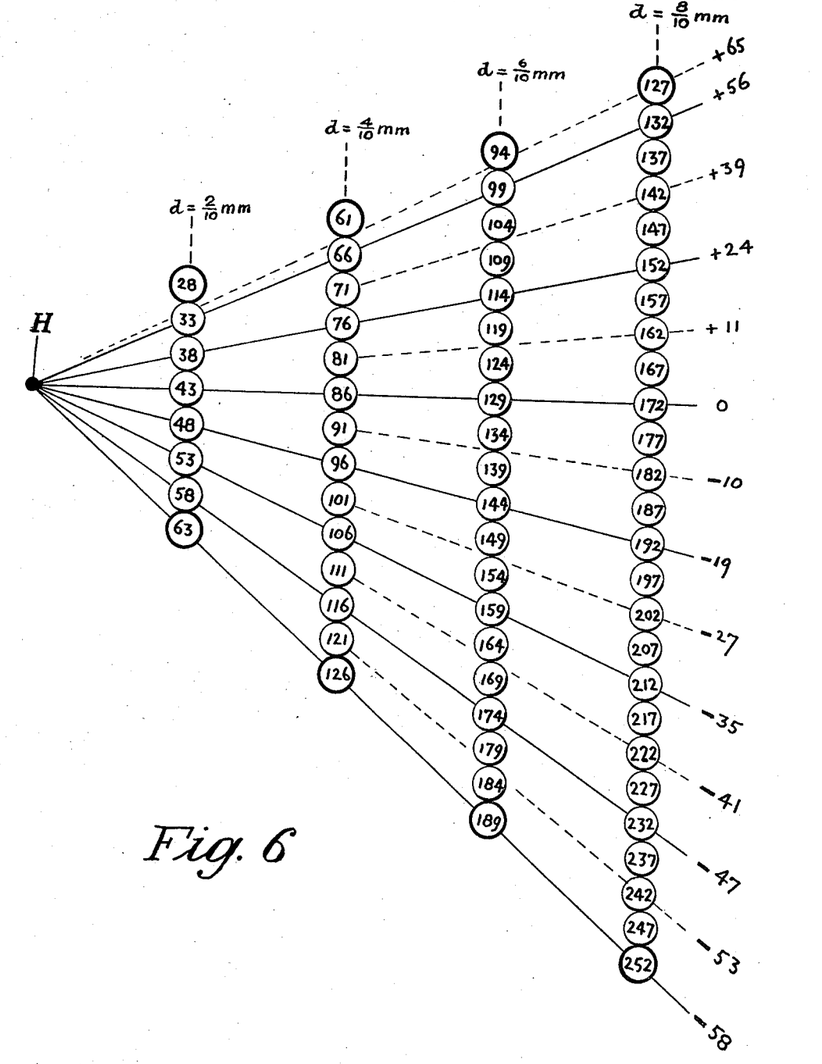

NOTE 32.—All equivalents may, therefore, be tabulated, to as high a value as desired, by the mechanical method indicated in Fig. 6; which shows the result of making $x$ in Equations 29, 30 and 31 successively equal to the numbers 1, 2, 3 and 4; and $y$ successively equal to 0, ±1, ±2, ±3, etc. The four basic lengths of Fig. 6 are, therefore, 43, 86, 129, 172 inches. The Wead series, referred to in Note 32, is intentionally omitted in Fig. 6.

NOTE 33.—In this Fig. 6 all solutions that are in alinement with the pole H are exact equivalents having the same I/M ratio and the same error. Thus the series 53, 106, 159, 212, etc., has an error of minus 35 parts in a million; and the series 101, 102, etc., has an error of minus 27 parts in a million. Hence all numbers that follow the smallest, in a given radially alined series, should be canceled, as not yielding any different solution.

NOTE 34.—All solutions surrounded, in Fig. 6, by a heavy circle have an error that is either equal to, or greater than, 58 parts in a million and can in no case be better than the solution afforded by the Boys 63-tooth wheel. But, all solutions having an error smaller than 58 millionths, if not duplicates under Note 33, may be retained, provided the lowest prime factor involved in their use is not too large.

NOTE 35.—Excluding, therefore, in Fig. 6, first, all duplicates; secondly, all results that do not comprise a prime factor higher than 199, because even a 199-tooth wheel would be inconveniently large, the I values listed in the comparatively limited chart of Fig. 6, yield fifteen different low factor equivalents, which are tabulated in Fig. 7, in order of their numerical I/M ratio, which is largest for the first, or 137-inch length; and smallest for the last or 247-inch length.

NOTE 36.—Although I should not care to use most of the change gear formulæ occurring between the 13 and the 33-inch lengths of Fig. 5, I am making a claim sufficiently general to include such formulæ, as I am the first to disclose them. In this generic claim all of the different change gear formulæ referred to in the present specification are more easily distinguished by their numerical I/M ratio, whose upper unattainable limit in the claim is that of Lodge and whose lower unattainable limit in the claim is that of Boys, or in decimals:

Lodge I/M ratio of $13/330 = 0.0393939_-$ (32)
Boys I/M ratio of $63/1600 = 0.0393750_-$ (33)

where each of the decimals can be completely expressed, as seen, in the form of a short period circulate.

NOTE 37.—In view of Equation 16, the product of I inches by 25.4, must equal the number of millimeters in the sum $(M+d)$ of the tabular Fig. 5; and, therefore, the I/M ratio of Note 36, multiplied by the same number 25.4 must yield the $(M+d)/M$ ratio of the same Fig. 5. The fifteen different values tabulated in the $(M+d)/M$ column of Fig. 5 may, therefore, be considered as representing the relative values of the fifteen corresponding I/M ratios, with the Wead I/M ratio of 5/127 considered equal to unity because 5/127 multiplied by 25.4 is 127/127.

NOTE 38.—Where I inches are considered equal to M millimeters, the fraction I/M evidently gives the corresponding value of one millimeter in inches; and this value multiplied by one thousand must give the correspondingly assumed value of the meter, in inches. That is to say, the same I/M ratio of Note 36 multiplied by 1000, or 1000-I/M, gives the number of inches in a metric screw one meter long, where "inch" stands for the particular inch determined by the $n$ pitch turns of the lead-screw that is used in cutting the metric screw.

Note 39.—I am aware that De Vries in "*The Calculation of Change Wheels for Screw Cutting on Lathes*", London and New York, 1914, page 49 (copy in the U. S. Patent Office Library), gives an involved problem which may be restated in simple form as follows: Cut a thread of pitch $p$ equal to 43/56 inch, from a lead-screw whose pitch P is 1/2 or 28/56 inch, so that the ratio of $p$ to P is as 43 to 28. The problem, however, was apparently contrived to bring in an unusual prime number, such as 43 so as to enable the author to remark: "No wheel with 43 teeth is to be found". The number 43, moreover, considered in De Vries independently of my present disclosures, has no relation whatever to metric measures; for, where De Vries does expressly refer to the cutting of metric threads, on this same page 49, and the preceding page 48, be used the old legal or Kater value of the inch (100 cm./39.37079=2.539954 cm.)

to derive fourteen different approximate common fraction centimeter values of the inch as follows: 28/11, 94/37, 61/24, 33/13, 127/50, 1049/413, 2225/876, 160/63, 287/113, 414/163, 541/213, 668/263, 795/313, 922/363, and not one of the twenty-eight different numbers here listed comprises 43 as a prime factor.

Note 40.—Any one of these fourteen different fractions of De Vries, multiplied by 10, yields the corresponding assumed millimetric value of the inch; and such millimetric value reversed, is the reciprocal or my corresponding I/M ratio. As I×25.4 equals M+$d$ the fourteen De Vries fractions may be arranged in logical order, according to the decreasing value of their I/M ratio, as in the following table:

|  | Inch in cms. | $I$ inches $= \dfrac{I \times 25.4}{\text{milli-meters}} = M+d$. |  | $\dfrac{M+d}{M}$ | Error in millionths. |
|---|---|---|---|---|---|
| Lodge.. | 33/13 | 13= | 330.2= 330+0.2 | 1.000,606 | + 423 |
| Boys.... | 160/63 | 63= | 1600.2= 1600+0.2 | 1.000,125 | − 58 |
|  | 287/113 | 113= | 2870.2= 2870+0.2 | 1.000,079 | − 104 |
|  | 414/163 | 163= | 4140.2= 4140+0.2 | 1.000,048 | − 135 |
|  | 541/213 | 213= | 5410.2= 5410+0.2 | 1.000,037 | − 146 |
|  | 668/263 | 263= | 6680.2= 6680+0.2 | 1.000,030 | − 153 |
|  | 795/313 | 313= | 7950.2= 7950+0.2 | 1.000,025 | − 158 |
|  | 922/363 | 363= | 9220.2= 9220+0.2 | 1.000,022 | − 161 |
|  | 1049/413 | 413=10490.2=10490+0.2 | | 1.000,019 | − 164 |
| Chambers.. | 2225/876 | 438=11125.2=11125+0.2 | | 1.000,018 | − 165 |
| Wead... | 127/50 | 5= | 127.0= 127+0.0 | 1.000,000 | − 183 |
|  | 94/37 | 37= | 939.8= 940−0.2 | 0.999,787 | − 396 |
|  | 61/24 | 12= | 304.8= 305−0.2 | 0.999,344 | − 839 |
|  | 28/11 | 11= | 279.4= 280−0.6 | 0.997,857 | −2326 |

Note 41.—The table of Note 40 shows: first, that the four De Vries fractions, to wit, 33/13, 160/63, 2225/876, and 127/50 are respectively identical with the Lodge, Boys, Chambers, and Wead solutions noted in my Fig. 5; secondly, that De Vries does not give any value lying between the Lodge solution which is my upper unattainable limit, and the Boys solution, which is my lower unattainable limit.

Figure 8:
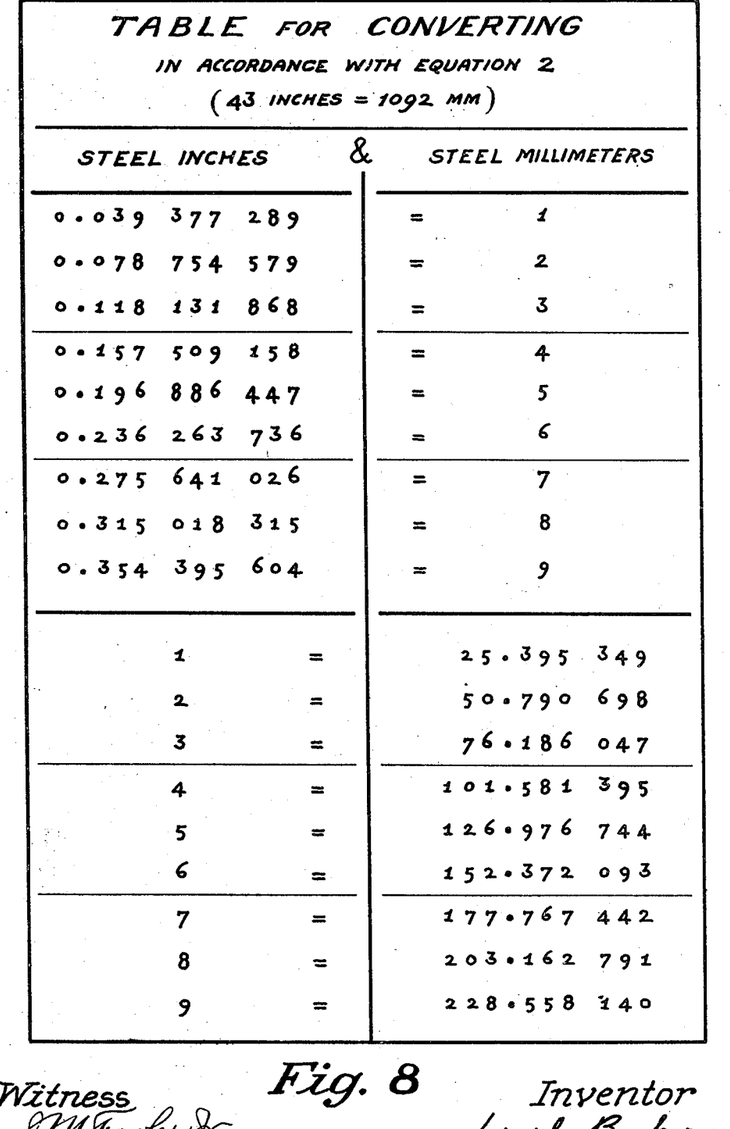
Fig. 8 is a table which permits of converting, by means of simple additions, any either whole or decimal number of inches in the lead-screw, to millimeters in the cut thread, or vice versa.

Note 42.—The exact value of the coefficient of expansion, corresponding to the rate of conversion used in Fig. 8, being 3/50 of $d$/M or 0.06×0.2/1092 equals 0.000010989; that is to say, 11 parts per million.

I claim:

1. The method of cutting screw threads having a pitch of $p$ millimeters by means of a lathe whose lead-screw has a pitch P equal to $1/n$ inch ($n$ being the number of turns per inch), said method consisting in: connecting the said lead-screw with the live spindle of the lathe by a train of change wheels in which the product $abc$, etc., of the tooth numbers in the series of driver wheels is to the product $a'b'c'$, etc., of the tooth numbers in the series of driven wheels, as the product $43pn$ is to 1092, where the largest prime number involved is 43, necessitating the use of a driver wheel whose tooth number is 43 or a higher integral multiple of 43, such as 86 or 129.

2. The method of cutting screw threads having a pitch of $p$ millimeters by means of a lathe whose lead-screw has a pitch P equal to $1/n$ inch ($n$ being the number of turns per inch), said method consisting in: connecting the said lead-screw with the live spindle of the lathe by a train of change wheels in which the product $abc$, etc., of the tooth numbers in the series of driver wheels is to the product $a'b'c'$, etc., of the tooth numbers in the series of driven wheels, as the product $43pn$ is to 1092, where the largest prime number involved is 43, necessitating the use of a driver wheel whose tooth number is 43 or a higher integral multiple of 43, such as 86 or 129; said series of driven wheels comprising one wheel whose tooth number is equal to the product of the prime factors 7 and 13, that is to say, equal to 91.

3. The method of cutting screw threads having a pitch of $p$ millimeters by means of a lathe whose lead-screw has a pitch P equal to $1/n$ inch ($n$ being the number of turns per inch), said method consisting in: connecting the said lead-screw with the live spindle of the lathe by a train of change wheels in which the product $abc$, etc., of the tooth numbers in the series of driver wheels is to the product $a'b'c'$, etc., of the tooth numbers in the series of driven wheels, as the product $Ipn$ is to M, where I and M, respectively representing inches and millimeters, are any two whole numbers such that $$I \times 25.4 = M\left(1 + \frac{50}{3}c\right),$$

the coefficient $c$ being substantially equal to the thermal coefficient of expansion of iron in its various commercial forms, say equal to any value that is greater than eleven minus three or eight millionths, and smaller than eleven plus three or fourteen millionths.

4. The method of cutting screw threads having a pitch of $p$ millimeters by means of a lathe whose lead-screw has a pitch P equal to $1/n$ inch ($n$ being the number of turns per inch), said method consisting in: connecting the said lead-screw with the live spindle of the lathe by a train of change wheels in which the product $abc$, etc., of the tooth numbers in the series of driver wheels is to the product $a'b'c'$, etc., of the tooth numbers in the series of driven wheels, as the product $Ipn$ is to M, where I and M, respectively representing inches and millimeters, are any two whole numbers such that their numerical I/M ratio shall be smaller than 13/330 and larger than 63/1600.

5. The method of cutting screw threads having a pitch of $p$ millimeters by means of a lathe whose lead-screw has a pitch P equal to $1/n$ inch ($n$ being the number of turns per inch), said method consisting in: connecting the said lead-screw with the live spindle of the lathe by a train of change wheels in which the product $abc$, etc., of the tooth numbers in the series of driver wheels is to the product $a'b'c'$, etc., of the tooth numbers in the series of driven wheels, as the product $Ipn$ is to M; where the ratio of $I \times 25.4$ to M, or its equivalent $(M+d)/M$, is smaller than 1.000,183 plus 0.000,058, or smaller than 1.000,241; and is larger than 1.000,183 minus 0.000,058, or larger than 1.000,125.

In testimony whereof I have signed my name to this specification.

JOSEPH BECKER.

Copies of this patent may be obtained for five cents each, by addressing the "Commissioner of Patents, Washington, D. C."